United States Patent [19]

Smolka et al.

[11] 4,249,903
[45] Feb. 10, 1981

[54] PROCESS FOR THE PREPARATION OF ALUMINO-SILICATE GRANULATES

[75] Inventors: Heinz G. Smolka, Langenfeld; Edgar Köppelmann, Hilden, both of Fed. Rep. of Germany

[73] Assignee: Henkel Kommanditgesellschaft auf Aktien, Dusseldorf-Holthausen, Fed. Rep. of Germany

[21] Appl. No.: 52,563

[22] Filed: Jun. 27, 1979

[30] Foreign Application Priority Data

Jul. 3, 1978 [DE] Fed. Rep. of Germany ....... 2829165

[51] Int. Cl.³ .................. B01J 39/14; C01B 33/28; C02F 1/42; C11D 3/12
[52] U.S. Cl. ................... 8/137; 23/313 R; 23/313 AS; 134/10; 252/135; 252/140; 252/174.25; 252/179; 252/448; 252/455 Z; 252/477 R
[58] Field of Search .......... 8/137; 23/313 R, 313 AS; 252/131, 135, 140, 174.25, 179, 455 Z, 448, 477 R; 134/10

[56] References Cited

U.S. PATENT DOCUMENTS

| | | | |
|---|---|---|---|
| 3,356,450 | 12/1967 | Heinze | 23/112 |
| 3,773,690 | 11/1973 | Heinze et al. | 252/455 Z |
| 3,795,631 | 3/1974 | Heinze et al. | 252/455 Z |
| 4,058,586 | 11/1977 | Chi | 423/118 |
| 4,120,653 | 10/1978 | Smolka | 8/137 |
| 4,121,903 | 10/1978 | Smolka | 8/137 |

FOREIGN PATENT DOCUMENTS 1203238 10/1964 Fed. Rep. of Germany .......... 423/118
1195730 7/1965 Fed. Rep. of Germany .......... 423/118

Primary Examiner—Dennis L. Albrecht
Attorney, Agent, or Firm—Hammond & Littell, Weissenberger and Muserlian

[57] ABSTRACT

A process for the preparation of a cation-exchanging alkali metal aluminosilicate granulate having a particle size of from 0.05 to 1 mm comprising (a) charging a finely-divided, crystalline water-containing alkali metal aluminosilicate powder having a calcium binding power of from 50 to 200 mg CaO/gm of anhydrous aluminosilicate and a particle size of less than 30μ into a conventional granulator, (b) adding thereto (i) m moles of $SiO_2$ as an aqueous alkali metal silicate solution or an aqueous silicic acid sol, and (ii) n mols of $Al_2O_3$ as an acidic hydrolyzing aluminum salt and/or alkali metal aluminate powder and/or an aqueous alkali metal aluminate solution, (c) mixing until the moisture is uniformly absorbed and a granulate with a particle size of 0.05 to 1 mm is formed, and (d) drying said granulate at 80° to 150° C.

17 Claims, No Drawings

PROCESS FOR THE PREPARATION OF ALUMINO-SILICATE GRANULATES

BACKGROUND OF THE INVENTION

The invention concerns a process for the preparation of a cation-exchanging alkali metal aluminosilicate granulate and its use for the removal of cations causing hard water during washing and cleansing, especially during the washing of textiles and during the cleansing of dishes while the wash liquor is circulated.

A possible way of reducing the eutrophication of bodies of water by detergent phosphates is by using methods of washing and cleansing which do not employ detergent phosphates. This requires other methods of binding the cations causing hard water. In the German Published Applications (DOS) 25 43 946 and 25 56 827, for example, methods of washing and cleansing are disclosed where the wash solution is circulated and the cations causing hard water are removed by ion exchangers from the circulation wash liquors in these processes. The ion exchangers suitable for this purpose are among others, synthetically prepared alkali metal aluminosilicates, referred to as "Aluminosilicate" in the following text, which have a large capacity for the exchange of cations. Crystalline, granular aluminosilicates are more suitable than finely divided aluminosilicates because of their easier handling.

Granulated aluminosilicates have long been known and employed for purposes of adsorption or as carriers for catalysts. Both inert or active substances are used as binding agents for the formation of these granulates. If inert substances such as, for example, clays or amorphous silicic acid are used as binding agents, the granulates prepared in this manner have a lower adsorptive capacity because their aluminosilicate content is reduced by the proportion of binding agent, and consequently they also have a lower ion exchange capacity, which makes them less suitable for the purpose of ion exchange.

Aluminosilicate granulates that contain active binders are also known, however. For example, in the process for the preparation of the aluminosilicate forms described in the German Pat. No. 12 03 238, aluminosilicate is used as granulating and binding agent. To this end, an aluminosilicate granulate is prepared as a starting material. This granulate is obtained by mixing an aluminosilicate powder with an aqueous silicic acid sol or an aqueous alkali metal silicate solution to form a granulate which is then dried. The aluminosilicate binder is then formed by treating this granulate with an alkaline alkali metal aluminate solution. This treatment also contributes to the adsorptive capacity of the molecular sieve forms, while at the same time imparting a high resistance to mechanical wear to the product of the process. This latter property is desirable for its use as an adsorptive agent. This high resistance to mechanical wear, however, makes these products, which are designed for use as molecular sieves in separation equipment, unsuitable for use as ion exchangers in wash liquors. Their exchange rate is too low, and a partial decomposition into finely divided aluminosilicate occurs in contact with the wash liquor, which is heated to 30° to 95° C. If an adequate softening of the wash liquor is nevertheless to be achieved with the known, commercial aluminosilicate granulates when washing with hard water, the washing time would have to be increased, or a considerably larger amount of the then only incompletely utilized aluminosilicate granulate would have to be used. Furthermore, filters with fine pores would have to be built into the wash liquor circulating system, to prevent the adsorption of the fine particles produced by this partial decomposition on the wash. Such an expedient would cause a correspondingly great loss of pressure in the system, and would also increase the danger of clogging the filters with lint or dirt.

The disadvantages found in the products of the German Pat. No. 12 03 238 are also present in the products formed by the processes in the German Published Applications DAS 15 67 557 and DOS 27 07 313. These patents employ products which are obtained from crystalline zeolite with pulverized metakaolin as binder. The pulverized metakaolin binder is converted into zeolite by thermal treatment with sodium hydroxide. These products are also used as adsorptive agents.

The products of the German Published application DAS 15 67 566 and DOS 27 15 678, obtained by changing metakolin alone into zeolite by treating with sodium hydroxide and heat and extrusion into formed particles, also find application in adsorption equipment and possess the previously described disadvantages of such products as well. Products such as those described in the German Published Application DOS 11 95 730 are not suitable as ion exchangers for wash liquors for the same reason. The products described in this application are derived from pieces of kaolin, used as starting material and are converted into zeolite by a subsequent treatment, and combined with an aqueous solution containing oxides of silicon, aluminum and of an alkali metal.

The aluminosilicate granulate prepared according to the known processes of the state of technology possesses the additional disadvantage of a frequently very high alkali content in the binder, which is the cause of an often undesirable increase in the pH of the wash or cleansing solution brought in contact with the aluminosilicate granulate for the purpose of softening.

A further disadvantage of the process of the state of technology for the preparation of granulates having an aluminosilicate binder is the necessity to prepare the product of the process in several successive process steps. This lowers considerably the reproducibility of the products of the process, and an aluminosilicate with variable properties is obtained.

OBJECT OF THE INVENTION

An object of the present invention is to provide a simple process for the preparation of an aluminosilicate granulate, the process yielding a granulate with a high cation-exchange capacity that can be used for the removal of hardness-causing cations from the water during washing and cleansing, and which is stable, especially under the conditions of washing textiles or cleaning dishes with a circulating wash liquor.

Another object of the present invention to the development of a process for the production of a cation-exchanging alkali metal aluminosilicate granulate having a particle size of from 0.05 to 1 mm consisting essentially of (a) charging a finely-divided, crystalline, water-containing alkali metal aluminosilicate having the molar composition of $$0.7-1.5 M_2O \cdot Al_2O_3 \cdot 0.8-6 SiO_2$$

wherein M represents a cation of an alkali metal, a particle size of less than 30μ and a calcium binding power of from 50 to 200 mg of CaO/gm of anhydrous aluminosilicate, into an area having means to mix a powder with a liquid, (b) adding thereto while mixing, either simultaneously or consecutively,
  (i) m mols of $SiO_2$ in a form selected from the group consisting of an aqueous solution of an alkali metal silicate having a molar ratio of 1 $Na_2O$:1 to 3.5 $SiO_2$ and an $SiO_2$ content of from about 10% to about 40% by weight, and an aqueous silicic acid sol having an $SiO_2$ content of from about 10% to about 40% by weight, and
  (ii) n mols of $Al_2O_3$ in a form selected from the group consisting of acidic hydrolyzing aluminum salts, powdered alkali metal aluminate, aqueous solution of alkali metal aluminate and mixtures, where the total amount of added $SiO_2$ being from 5% to 30% by weight of the mixture of aluminosilicate powder and added $SiO_2$, and the ratio of m:n being about 1:1 to about 5:1.

(c) mixing for from 1 to 120 minutes until the moisture is uniformly adsorbed by the solids and a granulate having a particle size of from 0.05 to 1 mm is formed, and (d) drying the granulate for 0.5 to 30 hours at a temperature of from 80° to 150° C.

A further object of the present invention is the obtaining of the cation-exchanging alkali metal aluminosilicate granules produced by the above process.

A yet further object of the present invention relates to the use of the above granulates for softening circulating wash liquor passing through said granulates in an area separate from the wash area.

These and other objects of the invention will become more apparent as the description thereof proceeds.

DESCRIPTION OF THE INVENTION

The drawbacks of the prior art have been overcome and the above objects have been achieved by the present invention, relating to a process for the preparation of a cation-exchanging aluminosilicate granulate with aluminosilicate as binder by the granulation of finely-divided aluminosilicate powder in conventional granulators. The process is characterized by the fact that (a) a finely divided crystalline aluminosilicate powder containing constitutional water with a molar composition of 0.7 to 1.5 $Kat_{2/n}O.Al_2O_3$.0.8 to 6 $SiO_2$ (Kat=a cation of valence n), with a particle size of less than 30μ and a calcium binding power of 50 to 200 mg CaO/gm of anhydrous aluminosilicate is charged into a conventional granulator, (b) there is added, simultaneously or one after the other,
  (i) m mols $SiO_2$ in the form of an aqueous solution of an alkali metal silicate of the molar composition 1 $Na_2O$:1 to 3.5 $SiO_2$, or of an aqueous silicic acid sol with an $SiO_2$ content in each about 10% to about 40% by weight, and
  (ii) n mols $Al_2O_3$ in the form of acidic hydrolyzing aluminum salts, preferably aluminum sulfate, and/or alkali metal aluminate as powder and/or as an aqueous solution, with the total amount of added $SiO_2$ being from 5% to 30% by weight, based on the mixture of solids consisting of aluminosilicate powder and added $SiO_2$, and the ratio m:n being about 1:1 to about 5:1, (c) mixing these substances 1 to 120 minutes, preferably 5 to 60 minutes, until the moisture is absorbed uniformly by the solids and a granulate is formed with a particle size of 0.05 to 1 mm, preferably 0.1 to 0.5 mm, and (d) drying the obtained granulate 0.5 to 30 hours, preferably 10 to 30 hours at 80° to 150° C., preferably 100° to 130° C.

More particularly the present invention relates to a process for the production of a cation-exchanging alkali metal aluminosilicate granulate having a particle size of from 0.05 to 1 mm consisting essentially of (a) charging a finely-divided, crystalline, water-containing alkali metal aluminosilicate having the molar composition of
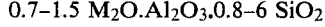
0.7–1.5 $M_2O.Al_2O_3$.0.8–6 $SiO_2$
wherein M represents a cation of an alkali metal, a particle size of less than 30μ and a calcium binding power of from 50 to 200 mg of CaO/gm of anhydrous aluminosilicate, into an area having means to mix a powder with a liquid, (b) adding thereto while mixing, either simultaneously or consecutively,
  (i) m mols of $SiO_2$ in a form selected from the group consisting of an aqueous solution of an alkali metal silicate having a molar ratio of 1 $Na_2O$:1 to 3.5 $SiO_2$, and an $SiO_2$ content of from about 10% to about 40% by weight, and an aqueous silicic acid sol having an $SiO_2$ content of from about 10% to about 40% by weight, and
  (ii) n mols of $Al_2O_3$ in a form selected from the group consisting of acidic hydrolyzing aluminum salts, powdered alkali metal aluminate, aqueous solutions of alkali metal aluminate and mixtures, where the total amount of added $SiO_2$ being from 5% to 30% by weight of the mixture of aluminosilicate powder and added $SiO_2$, and the ratio of m:n being about 1:1 to about 5:1, (c) mixing for from 1 to 120 minutes until the moisture is uniformly adsorbed by the solids and a granulate having a particle size of from 0.05 to 1 mm is formed, and (d) drying the granulates for 0.5 to 30 hours at a temperature of from 80° to 150° C.

The preparation of suitable powdery aluminosilicate as starting material for the process according to the invention is described, for example in U.S. Pat. No. 4,071,377, as well as in U.S. patent application Ser. No. 458,306, filed Apr. 5, 1974, now abandoned in favor of its continuation Ser. No. 800,308, filed May 25, 1977, now abandoned in favor of its continuation-in-part Ser. No. 956,851, filed Nov. 2, 1978. These alkali metal aluminosilicates as produced by precipitation, or converted to an aqueous suspension in a finely distributed state by other methods, may be converted from the amorphous state into the aged or crystalline state by heating to temperatures of from 50° C. to 200° C. The amorphous or crystalline alkali metal aluminosilicate, present in an aqueous suspension, can be separated from the remaining aqueous solution by filtration and can be dried at a temperature of, for example, 50° C. to 800° C. The product contains a greater or smaller quantity of bound water according to the drying conditions. Anhydrous products are obtained by drying for 1 hour at 800° C. However, the hydrous products are preferred, particularly those obtained when drying at 50° C. to 400° C., particularly 50° C. to 200° C. Suitable products can have, for example, water contents of approximately 2% to 30%, usually approximately 8% to 27%, relative to their total weight. Especially easily obtained aluminosilicates which are preferred because of their high cation exchange capacity are aluminosilicates of the NaA and NaX type. They are produced in a particle size of less than 30μ.

The granulation is carried out in known mixing granulators, with the addition of $SiO_2$-containing compounds, $Al_2O_3$-containing compounds, and water. A suitable granulator is, for example, the "EIRICH" counterflow mixing granulator, the construction and mode of operation of which are described in "Aufbereitungstechnik", 1970, issue 5, page 272. Also suitable is a granulating drum of the type of the "LÖDIGE" mixer, as described in "Aufbereitungstechnik", 1970, issue 5, page 263.

The mixing of the finely divided aluminosilicate in the granulator with the binder starting materials may be performed in various ways. In a preferred variation, the aluminosilicate powder is mixed dry with an aluminate powder, and the formation of granulate is brought about by the slow addition of an aqueous silicate solution with the partial or complete reaction of the silicate with the aluminate to form the aluminosilicate binder. In another variation that is also preferred, the aluminosilicate powder is first granulated with the addition of an aqueous aluminate and/or aluminum salt solution. The granulate is then sprayed, if desired after an intermediate drying, with a silicate solution or an aqueous silicic acid sol. These two process steps may also be carried out simultaneously in an especially preferred manner by the simultaneous addition of an aluminate and/or aluminum salt solution and a silicate solution to the aluminosilicate powder in the mixer, aluminum sulfate being the preferred acidic-hydrolyzing aluminum salt. The use of an acidic hydrolyzing aluminum salt leads to the formation of an aluminosilicate binder with a smaller excess of alkali. This procedure results in a reduction of an often undesirable release of alkali into the wash and cleansing solutions that are brought in contact with the granulate to remove the hardness-causing substances. Acidic hydrolyzing aluminum salts can replace the aluminate completely or partly as source of $Al_2O_3$, when granulates with a binder of a correspondingly low alkali content are desired. Aluminate and aluminum salt may also be added to the aluminosilicate powder in the form of a powder instead of in dissolved form. Then, the formation of granulate takes place upon the addition of the silicate solution. An otherwise possibly required intermediate drying becomes unnecessary with this method. Another method starts with a suspension of aluminosilicate powder and an aqueous silicate solution. Here, the formation of granulate is induced by the addition of additional aluminosilicate powder as well as aluminate powder, with the molar ratio of $SiO_2$ to $Al_2O_3$ in the binder at from 1:1 to 5:1, and the total amount of added $SiO_2$ being from 5% to 30% by weight (based on the mixture of solids content consisting of aluminosilicate powder and added $SiO_2$).

Granulates with a particle diameter of less than 2 mm are produced during the formation of granulate. The preferred particle size is 0.05 to 1 mm, with 0.1 to 0.5 mm being particularly preferred. This fraction is obtained by air-separation or sifting. Oversized granules are milled to this particle size and undersized granules are brought to the desired particle size by the repeated recycling into the granulator. A particle size of 0.05 to 1 mm is the most favorable size with respect to handling and ion exchange rate, whereas the fraction of from 0.1 to 0.5 mm has optimal properties.

After the formation of the granulate, this is dried for 0.5 to 30 hours, preferably 10 to 30 hours of heating at 80° to 150° C., preferably 100° to 120° C. A conversion of amorphous aluminosilicate, which acts as a binder, to crystalline aluminosilicate with a high calcium-complexing capacity takes place simultaneously during the drying.

The granulate obtained according to the invention possesses a good stability in cold and hot water. It amounts to 40% to 100%, measured by the method for the determination of grain stability described below, granulates with a stability of 70% to 100% being especially preferred. The granulates also have a high exchange capacity for the substances causing hard water. The calcium binding power of the granulates amounts to 40 to 150 mg CaO/gm of anhydrous aluminosilicate according to the method of determination for the calcium binding power described below and lies generally between 40 and 110 mg CaO/gm of anhydrous aluminosilicate. Thus it is many times greater than that of commercial aluminosilicate granulates.

Another object of the invention is also the use of the granulates as cation exchange agent for the softening of water during washing and cleansing processes, especially during the washing of textiles and cleansing of dishes with the circulation of the solution through ion exchange equipment located outside the washing or rinsing vessels, corresponding to the German published patent application DOS 25 43 946 and DOS 25 56 827. Beyond this, the aluminosilicate granulates prepared according to the invention are also used for the presoftening of the piped-in wash or rinse water.

The following examples are illustrative of the invention without being limitative in any respect.

EXAMPLES

The preparation of aluminosilicate granulate with aluminosilicate as binder according to the invention was started with dried, finely-divided crystalline aluminosilicate type NaA that still contained about 20% by weight of water of hydration. The preparation of the aluminosilicate used is described in Ser. No. 956,851 on page 32 for "Aluminosilicate I". It had a composition of 0.9 mol $Na_2O.1$ mol $Al_2O_3.2.05$ mol $SiO_2.4.3$ mol $H_2O$ and a calcium binding power of 150 mg CaO/gm of anhydrous aluminosilicate, determined by the method of determination given on page 31 of Ser. No. 956,851. Basically the same results are obtained with other aluminosilicates, provided that they have a good calcium binding power. For example, potassium zeolites and sodium aluminosilicates of the type NaX with a high exchange capacity are also very suitable for the preparation and use according to the invention.

EXAMPLE 1

16.4 kg of sodium aluminosilicate powder were premixed dry with 1.8 kg sodium aluminate (1.3 mol $Na_2O.1$ mol $Al_2O_3$) in a mixing granulator with a chopper produced by the firm Lödige. To this were added within 24 minutes and with constant mixing, a solution of 5.8 kg of sodium silicate of the composition 8.0% by weight $Na_2O$, 26.9% by weight $SiO_2$ and 65.1% by weight $H_2O$ in 4 liters of deionized water, under granulation conditions. After the addition of the silicate solution, the mixing was continued for another 5 minutes and the granulate obtained was then dried (110° C., 24 hours). The fraction with 0.2 to 0.4 mm grain size (Product 1) was tested for grain stability and calcium-complexing capacity under the following conditions:

Grain Stability

An amount of 6 gm of granulate is weighed into an upright Vigreux column (30 cm long, 5 cm diameter) that can be closed with a tissue (mesh size 0.06 mm) at the upper and lower end. The column is connected to a thermostat so that constant temperature water can circulate through it. The flow direction is controlled by a magnetic valve with a timing circuit to produce a flow from the bottom up for 2 seconds and from the top down for 1.5 seconds. The flow rate for the circulation in either direction is 4 liters per minute. This rhythm in the change of flow is maintained for 45 minutes at a water temperature of 90° C. The granulate is dried for 24 hours at 130° C. after filtering. The screen residue on a screen with 0.1 mm mesh is recorded in %, based on the originally weighed amount. When the amount having a grain size of over 0.1 mm is at least 40%, the established stability is adequate for use according to the invention.

Calcium-Complexing Capacity

One liter of an aqueous solution containing 0.396 gm $CaCl_2$ ($=200$ mg $CaO/l=20°$ dH) and with a pH adjusted to 10 with dilute NaOH is mixed with 1 gm of aluminosilicate granulate (based on anhydrous granulate). Then the suspension is agitated for 10 minutes at 50° C. and 500 rpm, with a blade agitator. After filtering the granulate, the residual hardness x of the filtrate is determined. The calcium-complexing capacity of the granulate is calculated from this as $(20-x) \times 10$ mg CaO/gm anhydrous aluminosilicate granulate. A calcium-complexing capacity of at least about 40 mg CaO/gm is adequate for use according to the invention.

The properties of the products obtained in the examples are compliled and compared with a commercial aluminosilicate granulate in the table given hereafter.

EXAMPLE 2

25 kg of aluminosilicate powder and 3.0 kg of sodium aluminate (1.3 mol $Na_2O.1$ mol $Al_2O_3$) powder were premixed dry in a counterflow mixer of the type Eirich MPM-mixer. A silicate solution of 11.2 kg of the sodium silicate solution of Example 1 in 7.8 kg of deionized water was sprayed on the powder mixture with continued mixing and granulate formation, with a spraying time of 5 minutes alternating with a pure mixing time, also of 5 minutes, without any spraying. The drying and testing of the granulate (Product 2) was carried out as in Example 1 and reported in the following table.

EXAMPLE 3

25 kg of aluminosilicate powder (mean particle size 4–5μ), 3 kg of $Al(OH)_3$ and 1 kg of NaOH powder were premixed dry in a counterflow mixer of the type Eirich MPM-mixer. A silicate solution of 8.1 kg of the sodium silicate solution of Example 1 in 6.3 l of deionized water was sprayed on this powder mixture with continued mixing and granulate formation, with a spraying time of 5 minutes during which one-third of the silicate solution was applied, alternating with a mixing time of 4 minutes without any spraying. After the addition of the silicate solution, mixing was continued for 15 minutes. The drying and testing of the granulate (Product 3) was performed as in Example 1 and reported in the following table.

EXAMPLE 4

250 gm of aluminosilicate were first sprayed with a solution of 27 gm of sodium aluminate (1.3 mol $Na_2O.1$ mol $Al_2O_3$) and 60 gm water, with the formation of granulate, in a laboratory mixture (type Bosch "Universal", with 2 rotating whirls). The granulate was dried at 130° C. and then sprayed with a solution of 86.4 gm of the sodium silicate solution of Example 1 and 60 gm water. The drying and testing of the granulate (Product 4) was performed as described in Example 1 and reported in the following table.

EXAMPLE 5

205 gm of a finely divided, commercial sodium aluminosilicate of the type NaX (Zeolite 13 x, UCC) of the composition 1.06 mol $Na_2O.1$ mol $Al_2O_3.2.48$ mol $SiO_2$ and containing 2.0% by weight of bound water were mixed in a laboratory mixer (Bosch "Universal", with 2 rotating whirls) with 30 gm of $NaAlO_2$ with a particle size of $<100\mu$ and sprayed with an aqueous solution of 95 gm of sodium silicate of the composition of 8.0% by weight $Na_2O$, 26.9% by weight $SiO_2$, 65.1% by weight $H_2O$ in 80 gm water, through a spray gun. After drying (130° C., 24 hours), the granulate (Product 5) had the properties recorded in the following table.

EXAMPLE 6

300 gm of aluminosilicate were placed in a laboratory mixer (type Bosch, "Universal", with 2 sets of rotating whirls). This aluminosilicate was then simultaneously sprayed with a mixture of a silicate solution consisting of 28.2 gm of the sodium silicate solution of Example 1 and 27.7 gm $H_2O$ and an aluminate solution consisting of 33.1 gm NaOH, 24.4 gm $Al(OH)_3$ and 83 gm $H_2O$, within 2.5 minutes, with the formation of a granulate. Upon the completion of the granulate formation, an additional 50 gm aluminosilicate were mixed in. Drying and testing the granulate (Product 6) were performed as described in Example 1 and reported in the following table.

EXAMPLE 7

150 gm of aluminosilicate powder, 86.4 gm of the sodium silicate solution of Example 1 and 60 gm water were mixed in a laboratory mixer (type Bosch "Universal", with 2 sets of rotating whirls), to form a homogeneous slurry. Then, a powdery mixture of 100 gm of aluminosilicate and 27 gm of sodium aluminate (1.3 mol $Na_2O.1$ mol $Al_2O_3$) was added in portions, within 10 minutes, with the formation of a granulate. The drying and testing of the granulate (Product 7) was performed as described in Example 1 and reported in the following table.

EXAMPLE 8

This example describes the preparation of a granulate that, upon suspension in water, releases less alkali into the water due to the lower alkali content in the aluminosilicate binder, thus counteracting a possibly undesirable elevation in the pH of the wash water.

28.5 kg of aluminosilicate were premixed dry with 6.1 kg of sodium aluminate (1.3 mol $Na_2O.1$ mol $Al_2O_3$) and 5.7 kg of $Al_2(SO_4)_3$ in a Lödige mixing granulator with chopper. Granulation occurred after the addition of a silicate solution consisting of 9.3 kg of the sodium silicate solution of Example 1. Drying and testing of the granulate (Product 8) was performed and described in Example 1 and reported in the following table. The pH of the an aqueous suspension of 10 gm of granulate/liter, determined after 15 minutes of agitation, is 9.3 for Product 8, while it is 11.8 for Product 1.

TABLE

| Product | Grain Stability % | Calcium-Complexing Capacity mg CaO/g |
|---|---|---|
| 1 | 75 | 88 |
| 2 | 75 | 77 |
| 3 | 84 | 95 |
| 4 | 78 | 96 |
| 5 | 75 | 96 |
| 6 | 40 | 98 |
| 7 | 45 | 88 |
| 8 | 75 | 88 |
| Commercial Granulate (x) | 100 | 6 |

(x) GRACE 4 A, 1.5-2.5 mm particle size.

It can be determined from the table that the granulates of the present invention have good grain stability and retain an excellent calcium-complexing or calcium exchanging power over the period of 10 minutes of exchange at 50° C.

The preceding specific embodiments are illustrative of the practice of the invention. It is to be understood however, that other expedients known to those skilled in the art or disclosed herein, may be employed without departing from the spirit of the invention or the scope of the appended claims.

We claim:

1. A process for the production of a cation-exchanging alkali metal aluminosilicate granulate having a particle size of from 0.05 to 1 mm consisting essentially of
   (a) charging a finely-divided, crystalline, water-containing alkali metal aluminosilicate having the molar composition of $$0.7–1.5 M_2O \cdot Al_2O_3 \cdot 0.8–6 SiO_2$$

wherein M represents a cation of an alkali metal, a particle size of less than 30μ and a calcium binding power of from 50 to 200 mg of CaO/gm of anhydrous aluminosilicate, into an area having means to mix a powder with a liquid,
   (b) adding thereto while mixing, either simultaneously or consecutively,
      (i) m mols of $SiO_2$ in a form selected from the group consisting of an aqueous solution of an alkali metal silicate having a molar ratio of 1 $Na_2O$:1 to 3.5 $SiO_2$, and an $SiO_2$ content of from about 10% to about 40% by weight, and an aqueous silicic acid sol having an $SiO_2$ content of from about 10% to about 40% by weight, and
      (ii) n mols of $Al_2O_3$ in a form selected from the group consisting of acidic hydrolyzing aluminum salts, powdered alkali metal aluminate, aqueous solution of alkali metal aluminate and mixtures, where the total amount of added $SiO_2$ being from 5% to 30% by weight of the mixture of aluminosilicate powder and added $SiO_2$, and the ratio of m:n being about 1:1 to about 5:1,
   (c) mixing for from 1 to 120 minutes until the moisture is uniformly adsorbed by the solids and a granulate having a particle size of from 0.05 to 1 mm is formed, and
   (d) drying the granulate for 0.5 to 30 hours at a temperature of from 80° to 150° C.

2. The process of claim 1 wherein, in said mixing step (c) is for 5 to 60 minutes.

3. The process of claim 1 wherein, in said mixing step (c), a granulate having a particle size of from 0.1 to 0.5 mm is formed.

4. The process of claim 1 wherein said drying step (d) is conducted for 10 to 30 hours at temperatures of from 100° to 130° C.

5. The process of claim 1, wherein said n mols of $Al_2O_3$ is powdered alkali metal aluminate which is first mixed with said finely-divided alkali metal aluminosilicate and thereafer said m mols of $SiO_2$ in the form of an aqueous solution of an alkali metal silicate is added and mixed.

6. The process of claim 1 wherein said n mols of $Al_2O_3$ is an aqueous solution of alkali metal aluminate which is first added and mixed with said finely-divided alkali metal aluminosilicate and thereafter said m mols of $SiO_2$ in the form of an aqueous solution of an alkali metal silicate is added and mixed.

7. The process of claim 1 wherein said n mols of $Al_2O_3$ is an aqueous solution of alkali metal aluminate and said m mols of $SiO_2$ is an aqueous solution of an alkali metal silicate and they are simultaneously added and mixed with said finely divided alkali metal aluminosilicate.

8. The process of claim 1 wherein a part of said finely-divided alkali metal aluminosilicate is mixed with said m mols of $SiO_2$ in the form of an aqueous solution of an alkali metal silicate to form a slurry, the remainder of said finely-divided alkali metal aluminosilicate is charged in step (b), said n mols of $Al_2O_3$ is powdered alkali metal aluminate which is added and mixed with the rest of said finely-divided alkali metal aluminosilicate and thereafter said slurry is added and mixed.

9. The process of claim 1 wherein said n mols of $Al_2O_3$ is a powder selected from the group consisting of powdery acidic hydrolyzing aluminum salts, and mixtures of powdery alkali metal aluminate and powdery acidic hydrolyzing aluminum salts which is first added and mixed with said finely-divided alkali metal aluminosilicate and thereafter said m mols of $SiO_2$ in the form of an aqueous solution of an alkali metal silicate is added and mixed.

10. The process of claim 9 wherein said acidic hydrolyzing aluminum salt is aluminum sulfate.

11. The cation-exchanging alkali metal aluminosilicate granulate having a particle size of from 0.05 to 1 mm, a grain stability when tested according to the grain stability test of at least 40% over 0.1 mm and a calcium-complexing capacity when tested according to the calcium-complexing capacity test at 50° C. for 10 minutes of at least 40 mg CaO per gm of anhydrous aluminosilicate granulate, produced by the process of claim 1.

12. In the process for softening circulating wash liquor comprising passing a wash liquor containing wash-active substances from the wash area through a separate area containing a solid cation exchanger and back to the wash area, the improvement comprising utilizing the cation-exchanging alkali metal aluminosilicate granulate of claim 11, as said solid cation exchanger.

13. The process of claim 12 wherein said wash area contains textiles to be washed.

14. The process of claim 12 wherein said wash area contains dishes to be washed.

15. In the process for softening wash liquor prior to washing comprising passing the wash liquor through a separate area containing a solid cation exchanger and thereafter to a separate wash area, the improvement comprising utilizing the cation-exchanging alkali metal aluminosilicate granulate of claim 11, as said solid cation exchanger.

16. The process of claim 15, wherein said wash area contains textiles to be washed.

17. The process of claim 15, wherein said wash area contains dishes to be washed.

* * * * *